May 14, 1968   N. G. DUGAN, JR   3,383,589
POWER SUPPLY TEST APPARATUS HAVING MEANS TO
REPEATEDLY SHORT THE POWER SUPPLY
Filed March 20, 1964

INVENTOR.
NORMAN G. DUGAN, JR

BY Vincent L. Carney

ATTORNEY

United States Patent Office 3,383,589
Patented May 14, 1968

3,383,589
POWER SUPPLY TEST APPARATUS HAVING MEANS TO REPEATEDLY SHORT THE POWER SUPPLY
Norman G. Dugan, Jr., West Chester, Pa., assignor to Burroughs Corporation, Detroit, Mich., a corporation of Michigan
Filed Mar. 20, 1964, Ser. No. 353,534
4 Claims. (Cl. 324—57)

This invention relates to the testing of electrical power supplies and more particularly relates to the testing of power supplies for transient voltage regulation under pulse loading conditions.

Power supplies used in high-speed switching circuits must be able to provide a regulated output voltage under repeated pulse-type current demands. In computer circuitry the repetition rate of the current pulses that are drawn from the power supply is large. Voltage overshoot occurs when current pulses having short rise times are drawn from the power supply. The power supplies must be able to adjust from a rapidly increasing current condition to a rapidly falling current condition without excessive overshoot for short width pulses.

It is desirable to be able to test power supplies so as to determine the ability of the power supply to provide a regulated voltage output under various loading conditions. A convenient device for determining the relationship between the voltage regulation, the magnitude of the current pulses, the repetition rate, and the pulse width of the load pulses is required. Accordingly, it is an object of this invention to provide a device for testing power supplies.

It is a further object of this invention to provide a device for determining the ability of the power supply to provide a regulated voltage output under a variety of loading conditions.

It is a still further object of this invention to provide a device for determining the magnitude, repetition rate and pulse width of pulse loads which may be drawn from a power supply without impairing its voltage regulation.

In accordance with the above objects, a device for testing the transient voltage regulation of a power supply under pulse loading conditions is provided. The testing device includes a means for observing the output voltage pulses from the power supply. This may be, for example, an oscilloscope.

The variable load is provided by a bank of transistors which are repeatedly driven into conduction so as to draw current from the power supply which is being tested. The transistors are controlled by a blocking oscillator which provides pulses of controllable width. The width of the load pulses drawn from the power supply can be adjusted by means of this blocking oscillator so as to observe the variations in regulation of the output voltage of the power supply on the scope as a function of the pulse width of the load.

The repetition rate of the pulses from the variable width oscillator is controlled by another blocking oscillator which has a controllable frequency. By adjusting this blocking oscillator the variations in voltage regulation of the power supply may be observed as a function of the repetition rate of the load pulses. The variable frequency blocking oscillator first triggers the scope and then triggers the variable width oscillator so that the output pulses from the power supply may be viewed on the oscilloscope.

This invention and the above noted and other features thereof will be understood more clearly and fully from the following detailed description with reference to the accompanying drawing in which:

FIGURE 1 is a block diagram of an embodiment of the invention;

FIGURE 2 is a schematic circuit diagram of an embodiment of the invention; and

FIGURE 3 is a power supply suitable for providing the necessary power to the testing device shown in FIGURE 2.

In FIGURE 1 a block diagram of a power supply testing device, which is an embodiment of the invention, is shown including a power supply 10, which is to be tested and including a power supply output terminal 12. The terminal 12, a variable resistance load 14, a variable width blocking oscillator 16, a delay 18, a terminal 20 and a variable frequency blocking oscillator 22 are electrically connected in series with each other in the order named. The terminal 20 is also electrically connected to the trigger of a scope 24 through another delay 25. The scope trigger 24 and the output terminal 12 of the power supply 10 are each electrically connected to the oscilloscope 26.

The variable frequency blocking oscillator 22 provides periodic voltage pulses to the terminal 20. These pulses pass through the delay 25 to the scope trigger 24, which triggers the scope 26. The voltage pulses of the variable frequency oscillator 22 are also passed from terminal 20 through the delay 18 to the variable width blocking oscillator 16. These pulses trigger the variable width blocking oscillator 16, which in turn provides pulses to the variable resistance load 14. Each time the variable resistance load 14 is pulsed, it changes the resistance between the terminal 12 and ground from a very high value to a very low value, thus drawing a heavy pulse load from the power supply 10. The output voltage pulses from the power supply 10 are viewed on the scope 26.

The variable width blocking oscillator 16 may be adjusted so as to vary the width of its output pulses. Since the resistance provided by the variable resistance load 14 to the output of the power supply 10 is controlled by the pulses from the variable width blocking oscillator 16, the regulation of the power supply 10 for various widths of output pulses may be observed on the scope 26. The variable frequency blocking oscillator 22 may be adjusted so as to change its repetition rate. Since the repetition rate of the variable width blocking oscillator 16 and the current pulses from the power supply 10 are controlled by the variable frequency blocking oscillator 22, the regulation of the power supply 10 may be observed on the scope 26 for various repetition rate loading conditions by changing the repetition rate of the variable frequency blocking oscillator 22.

To observe, record, or photograph the output pulses from the power supply 10, it is necessary to position the leading or trailing edges of the pulses on the oscilloscope screen using a fast time base. This is done by adjusting the delay 25 and the delay 18. The delay 25 determines the time that the scope will be triggered, and the delay 18 determines when a load current will be drawn from the power supply 10.

In FIGURE 2, a schematic circuit diagram of the testing device shown in FIGURE 1 in block diagram form is shown. This schematic circuit diagram does not include the power supply which is to be tested nor does it include the power supply used to supply power for the operation of the testing device, hereafter called the operating power supply. Terminal 30 is electrically connected to the positive output terminal of the power supply that is to be tested, and terminal 32 is electrically connected to the ground or negative terminal of the power supply that is to be tested. Terminal 34 is electrically connected to the input of the oscilloscope 26.

The variable frequency blocking oscillator includes the 2N269 PNP transistor 36. The emitter of the transistor 36 is electrically connected to a source of positive 7 volts 38 provided by the operating power supply, as shown in FIGURE 3, and is also connected to one end of the winding 40 of the blocking oscillator transformer 42; the other end of the winding 40 is connected to the base of the transistor 36 through a 0.2 mf. (microfarad) capacitor 44.

The other end of the winding 40 is also connected to the output terminal of the blocking oscillaotr 46. Another winding 48 of the transformer 42 is wound in the opposite direction as the winding 40. One end of the winding 48 is electrically connected to the collector of the transistor 36 and the other end is connected to the ground connection 78 of the operating power supply shown in FIGURE 3, and also to the base of the transistor 36 through the 2K (kilo-ohm) resistor 50 and the 200K potentiometer 52. A diode 54 has its anode electrically connected to the ground connection of the operating power supply and has its cathode electrically connected to the collector of the transistor 36. A 330 ohm resistor 56 shunts the winding 48.

When the positive 7 volts is electrically connected to the transistor 36, it begins to conduct, passing current through the winding 48 of the transformer 42. A voltage is induced in the opposite direction in winding 40 providing a pulse to the blocking oscillator terminal 46, charging up the capacitor 44 and biasing the transistor 36 to cutoff. After the transistor 36 has been cut off, the charge on the capacitor 44 leaks off through the resistors 52 and 30 until the transistor 36 is biased back into conduction. This process is repeated so as to provide a series of positive output voltages at the terminal 46. The repetition rate of these output pulses is determined by the adjustment of the potentiometer 52. The adjustment to this potentiometer, then, determines the rate at which the power supply that is being tested must provide current pulses to the simulated load.

The terminal 46 provides negative voltage pulses to each of two delays. It is connected to the base of the 2N269 PNP transistor 58 through the 1800 ohm resistor 60 and to the base of the 2N269 PNP transistor 62 through the 1800 ohm resistor 64. The base of the transistor 58 is electrically connected to the collector of the 2N269 PNP transistor 66 through the 1800 ohm resistor 68 and the base of the transistor 62 is electrically connected to the collector of the 2N269 PNP transistor 70 through the 1800 ohm resistor 72. The emitters of the transistors 58, 66, 62 and 70 are each electrically connected to the source of a positive 7 volts 38.

The collector of the transistor 58 is electrically connected to the base of the transistor 66 through the 2000 mf. capacitor 74; the collector of transistor 62 is electrically connected to the base of transistor 70 through the 1000 mf. capacitor 76. The collector of the transistor 58 and the collector of the transistor 62 are each electrically connected to the ground terminal 78 of the operating power supply through separate 600 ohm resistors 80 and 82, respectively. The base of the transistor 66 is electrically connected to the operating power supply ground terminal 78 through the 1K resistor 84 and the 50K potentiometer 86; the base of transistor 70 is electrically connected to the ground terminal 78 through the 1K resistor 88 and through the 50K potentiometer 90. The collector of the transistor 66 is electrically connected to one end of the 680 ohm resistor 92 and to one plate of the 3000 mf. capacitor 94; the other end of the resistor 92 is electrically connected to ground terminal 78, to the anode of the diode 96 and to one end of the 680 ohm resistor 98. The other end of the capacitor 94 is electrically connected to the cathode of the diode 96 and to one end of the winding 100 of the transformer 102. The other end of the winding 100 is electrically connected to the other end of the other end of the resistor 98. The collector of the transistor 70 is electrically connected to one end of the 680 ohm resistor 104 and to one plate of the 3000 mf. capacitor 106. The other end of the resistor 104 is electrically connected to the ground termnial 78, one end of the 2.2K resistor 107 and to the anode of the diode 108. The other plate of the capacitor 106 is electrically connected to the other end of the resistor 107 and to the cathode of the diode 108.

The negative pulse from the variable frequency blocking oscillator turns off the transistor 62 in one delay multivibrator and the transistor 58 in the other delay multivibrator. This results in a positive output pulse at the collectors of each of these two transistors. The positive pulse from the collector of the transistor 58 cuts off the normally conducting transistor 66 in one of the delays and the positive pulse at the collector of the transistor 62 cuts off the normally conducting transistor 70 in the other delay. When the transistor 66 is cut off, a negative pulse is provided to the winding 100 of the transformer 102, followed by a positive pulse delayed in time. Similarly, when the transistor 70 is cut off, a negative pulse is provided at the cathode of the diode 108, followed by a positive pulse delayed in time. The amount of delay between the time that a negative pulse is provided to terminal 46 by the variable frequency blocking oscillator and the time that a positive pulse is provided to the winding 100 and to the cathode of the diode 108 is adjusted by the potentiometers 86 and 90, respectively.

A secondary winding 110 is wound in the same direction as the winding 100 on the transformer 102. A diode 112 is electrically connected across this winding; the cathode of the diode 112 is electrically connected to the same end of the winding 110 which corresponds to the end of the winding 100 which is electrically connected to the resistor 98. The anode of the diode 112 is grounded and its cathode is electrically connected to the scope trigger 114.

The cathode of the diode 108 is electrically connected to the input terminal 116 of the variable width blocking oscillator through the 5 mf. capacitor 118. Terminal 116 is electrically connected to one end of the 6.8K resistor 120 and to the base of the 2N269 PNP transistor 132. The ground connection 78 of the operating power supply is electrically connected to the other end of the resistor 120, to one end of the 470 ohm resistor 122, to one end of the 100 ohm potentiometer 124, to terminal 126, to one end of the 50 mf. capacitor 128, and to one end of the 100 ohm resistor 130. The other end of resistor 122 is electrically connected to the collector of the transistor 132 and to one plate of the 25 mf. capacitor 134. The other end of the capacitor 134 is electrically connected to one end of the winding 136 of the transformer 138.

The source of a positive 7 volts 38 is electrically connected to the emitter of the transistor 132, to the other end of the winding 136, and to one end of the 0.5 ohm resistor 140. The other end of the resistor 140, the other plate of the capacitor 128, and the other end of the resistor 130 are electrically connected to the emitter of the 2N269 PNP transistor 142 through the 1 ohm resistor 144 and to the emitter of the 2N269 PNP transistor 146 through the 1 ohm resistor 148. The collector of the transistor 142 is electrically connected to a terminal 150 through a 10 ohm resistor 152 and the collector of the transistor 146 is electrically connected to the terminal 150 through a 10 ohm resistor 154. The terminal 150 is electrically connected to one end of a second winding 156 of the transformer 138 and to the cathode of a diode 158. The other end of the winding 156 is electrically conncted to the other end of the potentiometer 124, to a terminal 160, and to the anode of the diode 158. The winding 156 is wound in the opposite direction as the winding 136.

The positive pulse on winding 110 at the output of one of the time delays triggers the sweep of the oscilloscope 114. The positive pulse from the output of the other time delay triggers the variable width blocking oscillator through the capacitor 118. This positive pulse is inverted and amplified by the transistor 132 and passed to the parallel transistors 142 and 146. These transistors, being normally cut off, are turned on, generating a positive pulse at terminal 160 having a width which is determined by the inductance of winding 156 of the transformer 138, and the potentiometer 124. The transformer action produces a fast rise and fall of the pulse. The pulse width of the pulses at terminal 160 is adjusted at this stage by changing the inductance of the transformer 138. The rise and fall time of the output from this stage is approximately 0.3 microsecond. Approximately 200 milliamperes may be drawn from this stage.

Terminal 126 is electrically connected to the emitter of the 2N914 NPN transistor 162 and to the emitter of the 2N914 NPN transistor 164. Terminal 160 is electrically connected to the base of transistor 162 through the parallel combination of the 47 ohm resistor 166 and the 0.1 mf. capacitor 168 and to the base of the transistor 164 through the parallel combination of the 47 ohm resistor 170 and the 0.1 mf. capacitor 172. The collectors of the transistors 162 and 164 are each electrically connected to the source of a positive 7 volts 38 through the two parallel 0.1 ohm resistors 174 and 176. The collectors of the transistors 162 and 164 are also electrically connected to the terminal 180 of the double throw, double pole switch 182.

The positive voltage pulses applied to terminal 160 by the variable width blocking oscillator biases the parallel transistors 162 and 164 into conduction. The resistors 166 and 170 are base-current limiting resistors and the capacitors 168 and 172 are shunted across these resistors to provide a faster rise and fall time of the drive current pulse. Whenever the two transistors are biased into conduction they provide a negative pulse to the terminal 180, which negative pulse is used to turn on the load transistors in the variable resistance load 14. The driver stage is used to provide the higher drive current switching requirements of the power transistors 200, 202 and 210. It can draw approximately 1300 milliamperes with a rise and fall time of approximately 0.5 microsecond when switch 182 is in its low voltage position.

When the double-pole, double-throw switch 182 is in the position shown, the terminal 180 is electrically connected to the terminal 184 and a terminal 186 is electrically connected to a terminal 188; when the switch 182 is in its opposite position, the terminal 180 is electrically connected to the terminal 190 and the terminal 186 is electrically connected to the terminal 192. The terminal 184 is electrically connected to one end of the 47 ohm resistor 194, to one end of the 47 ohm resistor 196, and to the terminal 198. The other end of the resistor 194 is electrically connected to the base of the 2N269 PNP transistor 200 and the other end of the resistor 196 is electrically connected to the base of the 2N269 PNP transistor 202. Terminal 188 is electrically connected to the collector of transistor 200 through the 2 ohm resistor 204 and to the collector of the transistor 202 through the 2 ohm resistor 206. The emitter of the transistors 200 and 202 are electrically connected to the terminal 30, the terminal 208, the emitter of 2N174 PNP transistor 210 and to terminal 212. A terminal 214 is also electrically connected to the terminal 188.

The terminal 190 is electrically connected to the base of the transistor 210 through the parallel combination of the 47 ohm resistor 216 and the 2 mf. capacitor 218. The terminal 190 is also electrically connected to the terminal 220. Terminal 192 is electrically connected to the collector of the transistor 210 through the 0.5 ohm resistor 222 and to terminal 224. Terminal 186 is electrically connected to terminal 226 through the 25 ohm potentiometer 228; terminal 226 is electrically connected to the oscilloscope input terminal 34 and to the test negative power supply input terminal 32 through a 0.1 ohm resistor 227.

When the double pole, double throw switch 182 is in a position such that terminal 180 is electrically connected to terminal 184 and terminal 186 is electrically connected to terminal 188, the negative pulses from terminal 180 bias the transistors 200 and 202 into conduction through the current limiting resistors 194 and 196. The emitters of these transistors are electrically connected to the terminal 30 which in turn is electrically connected to the plus side of the power supply being tested. The collectors each have a low value series limiting resistors 204 and 206. The limiting resistors are connected to a 25 ohm rheostat 228 which controls the load current. This control is connected to the 0.1 ohm resistor 227 which is used as a current monitor. Additional transistors and resistors are generally connected to the terminals 198, 208 and 214 so as to increase the number of transistors that are in parallel. With eight additional stages to make a total of ten stages, approximately 5 amperes of current is drawn from the power supply which is being tested with a rise and fall time of between 0.05 microseconds to 1 microsecond depending on the amount of load current. The switch 182 was used in this position for power supply voltages between 2 and 12 volts.

For testing power supplies between 12 volts and 50 volts, the double-pole, double-throw switch 182 is connected so that terminal 180 is electrically connected to terminal 190 and so that terminal 186 is electrically connected to terminal 192. With one of the 2N174 transistors as shown, 5 amperes may be drawn from the power supply which is being tested. However, additional transistors may be electrically connected to the terminals 220, 224 and 212.

In FIGURE 3, a schematic circuit diagram of the operating power supply which is used to supply the positive 7 volts to the test device shown in the schematic circuit diagram of FIGURE 2 is shown. In this power supply the primary winding 250 of the transformer 252 is electrically connected at one end to the input terminal 254 through the ⅛ of an ampere fuse 256 and is electrically connected at the other end to the input terminal 258 through the power switch 260. The secondary winding 262 of the transformer 252 is electrically connected at one end to the cathode of the diode 264 and to the anode of the diode 266 and is electrically connected at the other end to the cathode of the diode 268 and to the anode of the diode 270. The anodes of the diodes 264 and 268 are electrically connected to one plate of the 2000 mf. capacitor 272, to one plate of the 2000 mf. capacitor 274, to one end of the 1000 ohm resistor 276, and to the power supply ground terminal 78. The cathodes of the diodes 266 and 270 are electrically connected to the other plate of the capacitor 272 and to one end of the 0.5 ohm inductor 278. The other end of the inductor 278 is electrically connected to the other end of the capacitor 274, to the other end of a resistor 276, and to the positive 7 volt output terminal 38 of the operating power supply.

The terminal 254 and 258 are electrically connected to a 117 volt A.C., 60 cycle source of power. The transformer 252 steps the 117 volts down to 6.3 volts. The diodes 264, 266, 268 and 270 form a full wave bridge rectifier to provide a rectified voltage to the filter formed by the capacitors 272 and 274, the inductor 278, and the resistor 276. The power supply provides approximately 450 milliamperes at a positive 7 volts from the terminal 38.

The testing device of this invention can be used to evaluate power supplies ranging from 0 volts to 50 volts across a wide range of current loads. If vacuum tubes are used instead of transistors, higher voltage current supplies may be tested. The test device can be moved easily, is completely self-contained, and requires no pulse control equipment or power other than 110 volt, A.C. line voltages. It makes it possible to observe the overshoot in the output voltage of regulated power supplies when subjected to current loads having fast rise and fall times. Also, the ability of a power supply to supply a pulse load having a short width or higher frequency may be observed.

Obviously, many modifications and variations of the present invention are possible in the light of the above teachings. It is therefore to be understood that within the scope of the appended claims, the invention may be practiced otherwise than as specifically described.

What is claimed is:
1. Apparatus for testing a power supply comprising:
   pulse generating means for generating periodic voltage pulses;
   frequency adjusting means, electrically connected to said pulse generating means, for adjusting the repetition rate of said pulse generating means;
   an oscilloscope;
   said pulse generating means being electrically connected to the trigger of said oscilloscope so as to trigger the sweep circuit of the oscilloscope;
   a delay multivibrator electrically connected at one end to said pulse generating means, whereby said pulses from said pulse generating means may be delayed until after said oscilloscope sweep has been triggered;
   pulse shaping means, electrically connected to the other end of said delay means, for generating a voltage pulse on a pulse shaping output terminal each time a voltage pulse is received on a pulse shaping input terminal;
   pulse width control means, electrically connected to said pulse shaping means, for controlling the width of said voltage pulses applied to said pulse shaping means output terminal; and
   variable impedance means, adapted to be connected to an output terminal of a power supply and to the input of said oscilloscope and being electrically connected to said pulse shaping circuit and adapted to be coupled to ground through a low impedance upon receiving a voltage pulse from said pulse shaping circuit, whereby the output voltage of said power supply may be observed on said oscilloscope under pulse loads of different repetition rate and time width.

2. Apparatus for testing a power supply in accordance with claim 1 in which said pulse shaping means comprises:
   a resistor having a first terminal adapted to be connected to a source of positive potential and having a second terminal;
   a capacitor having a first plate adapted to be connected to the ground connection of said positive source of potential and having a second terminal electrically connected to said other plate;
   a transistor having one current electrode electrically connected to said second terminal of said resistor and to said second terminal of said capacitor;
   a transformer having a secondary winding and a primary winding;
   an input terminal;
   said primary winding of said transformer being electrically connected at one end to said input terminal and to a second current electrode of said transistor and at the other end being adapted to be coupled to said source of positive voltage; and
   an output terminal;
   said secondary winding of said transformer being electrically connected at one end to said output terminal and at its other end to a control electrode of said transistor.

3. The combination for dynamically loading and monitoring the operation of a power supply independently of frequency variation of the energizing voltage applied to the power supply comprising:
   an input terminal and a reference potential terminal adapted to be coupled to the output terminals of an independently energized power supply;
   a variable impedance electrically connected at one end to said input terminal and at the other end to said reference potential terminal;
   triggerable waveform display means adapted to be coupled to said power supply for monitoring the voltage of the power supply;
   variable frequency pulse generating means generating periodic pulse signals for repeatedly triggering said display means and changing the impedance of said variable impedance;
   first and second individual delay means electrically connecting the generating means to the indicating means and to the variable impedance means, respectively; and
   signal control means electrically connected to said pulse generating means for controlling the width of the pulses applied to said variable impedance; whereby the load current drawn through said power supply is repeatedly varied at a selected rate and pulse time width for indicating the dynamic regulation of said power supply.

4. The combination for monitoring the operation of a power supply according to claim 3 in which said signal control means comprises a variable width triggerable oscillator and pulse shaping means having an input terminal electrically connected to said second delay means and an output terminal electrically connected to said triggerable oscillator.

References Cited
UNITED STATES PATENTS

| | | | |
|---|---|---|---|
| 2,293,135 | 8/1942 | Hallmark | 324—57 X |
| 2,651,753 | 9/1953 | Buyer | 324—57 |
| 2,936,418 | 5/1960 | Young | 324—121 X |
| 2,971,102 | 2/1961 | Schultz | 323—22 |
| 2,980,845 | 4/1961 | Thompson et al. | 307—88.5 |
| 3,031,585 | 4/1962 | Frady | 328—100 X |
| 3,215,935 | 11/1965 | Mead et al. | 323—22 X |

RUDOLPH V. ROLINEC, *Primary Examiner.*

WALTER L. CARLSON, *Examiner.*

G. L. LETT, E. F. KARLSEN, *Assistant Examiners.*